United States Patent [19]

Paar et al.

[11] Patent Number: 4,711,934

[45] Date of Patent: Dec. 8, 1987

[54] SELF-CROSSLINKING CATIONIC PAINT BINDERS CONTAINING UREA GROUPS AND PROCESS OF MANUFACTURE

[75] Inventors: Willibald Paar; Michael Hönel; Johann Gmoser, all of Graz, Austria

[73] Assignee: Vianova Kunstharz, A.G., Werndorf, Austria

[21] Appl. No.: 887,934

[22] Filed: Jul. 22, 1986

[30] Foreign Application Priority Data

Jul. 22, 1985 [AT] Austria .................................. 2157/85
Sep. 18, 1985 [AT] Austria .................................. 2712/85
Sep. 25, 1985 [AT] Austria .................................. 2786/85
Dec. 18, 1985 [AT] Austria .................................. 3650/85
Jun. 27, 1986 [AT] Austria .................................. 1743/86

[51] Int. Cl.$^4$ ........................ C08F 40/00; C08L 63/00
[52] U.S. Cl. .................... 525/452; 204/181.7; 523/414; 523/415; 524/901; 525/481; 525/488; 525/528
[58] Field of Search ............... 525/452, 486, 488, 528, 525/481

[56] References Cited

U.S. PATENT DOCUMENTS

| | | | |
|---|---|---|---|
| 3,994,989 | 11/1976 | Kempter et al. | 525/490 |
| 4,086,292 | 4/1978 | Kempter et al. | 525/484 X |
| 4,134,932 | 1/1979 | Kempter et al. | 525/481 |
| 4,310,646 | 1/1982 | Kemper et al. | 525/528 |
| 4,393,179 | 7/1983 | Hoppe et al. | 525/490 |

FOREIGN PATENT DOCUMENTS 1021493  11/1977  Canada .
1074489   3/1980  Canada .

*Primary Examiner*—Theodore E. Pertilla
*Attorney, Agent, or Firm*—A. W. Breiner

[57] ABSTRACT

A process for producing self-crosslinking cationic paint binders, water-dilutable upon protonation, on the basis of urea group carrying reaction products of modified phenols and epoxy resins as well as with the binders produced according to the process and their use in stoving paints, particularly in electrodeposition paints is described. The process is characterized in that either an aminoalkylation product of a phenol and a semi-blocked diisocyanate carrying an average of at least one secondary amino group, or a substituted urea prepared from a semi-blocked diisocyanate and an amine, which is further reacted with formaldehyde and a phenol, are reacted with an epoxy compound. The paints formulated with these products, at stoving temperatures of from 150° to 170° C., give films with excellent corrosion resistance and adhesion.

14 Claims, No Drawings

SELF-CROSSLINKING CATIONIC PAINT BINDERS CONTAINING UREA GROUPS AND PROCESS OF MANUFACTURE

RELATED CASES

This application relates to concurrently filed Johann Gmoser et al, United States application entitled "Self-Crosslinking Cationic Paint Binders Containing Urea and Urethane Groups and process of Manufacture."

FIELD OF INVENTION

The present invention is directed to a process for producing self-crosslinking cationic paint binders and to the binders of the process. More particularly, the invention relates to self-crosslinking cationic paint hinders, water-dilutable upon protonation, based on urea group carrying reaction products of modified phenols and epoxy resins.

BACKGROUND OF INVENTION

Paint binders are disclosed in DE-OS No. 23 20 301, corresponding to Canadian Pat. No. 1,021,493, which are obtained by reaction of MANNICH-bases (of condensed phenols, secondary alkanolamines and formaldehyde) with an epoxy resin. Similar binders are disclosed in DE-OS No. 24 19 179, corresponding to U.S. Pat. No. 3,994,989. As stated in DE-OS No. 27 11 385, such systems have the disadvantage that amines are split-off on stoving. Therefore, it has been proposed to use a MANNICH-condensation product of a phenol and/or an alkylphenol, a primary amine, and formaldehyde.

Another proposal for improving the products of the DE-OS No. 23 20 301 and DE-OS No. 24 19 179 references is disclosed in DE-OS No. 27 11 425, corresponding to U.S. Pat. No. 4,134,932, where to such binders water-insoluble urethane group carrying resins are added, and in particular the modified polyamide amine resins. To avoid the splitting off of amines, DE-OS No. 25 41 801, corresponding to U.S. Pat. No. 4,086,292, proposes to react the MANNICH-base with an epoxy resin based on polyhydric alcohols, the hydroxy groups of which are reacted with semi-blocked diisocyanates and optionally with a urethane-free epoxy resin. DE-OS No. 25 54 080, corresponding to Canadian Pat. No. 1,074,489, describes a similar process. In all these cases the reaction with the isocyanates is to suppress the split-off of amines on stoving.

The products produced according to the teachings of the aforesaid references, however, do not meet the requirements of the automobile industry with respect to corrosion resistance at crosslinking temperatures of from about 150 to 170° C. and the adhesion of the stoved film, particularly the adhesion of subsequent coats.

SUMMARY AND GENERAL DESCRIPTION OF INVENTION

It has now been found that the requirements of the automobile industry can be met, if throuqh judicious selection of the starting materials and by selection of specific steps of the process, modified urea groups are introduced into the binder systems. Thus, the present invention is concerned with a process for producing self-crosslinking cationic paint binders, water-dilutable on protonation, based on reaction products of substituted urea-phenol-formaldehyde condensates and epoxy resins, and to the binders thereby produced. The process and binders are characterized in that (A-1) an aminoalkylation product carrying an average of at least one NH-group per molecule, of phenol and/or a substituted phenol, preferably a monoalkyl-, monoaryl- or monoaralkylphenol with one or optionally two phenolic hydroxy groups, a primary alkylamine and/or primary alkanolamine and/or alkylenediamine and formalydehyde or a formaldehyde donating compound is reacted with a semi-blocked diisocyanate, or (A-2) a semi-blocked diisocyanate is reacted with a primary alkylamine and/or primary alkanolamine and/or alkylene diamine and the resulting substituted urea is reacted with formaldehyde or a formaldehyde donating substance and phenol and/or a substituted phenol preferably a monoalkyl-, monoaryl-, or monoaralkylphenol with one or optionally with two phenolic hydroxy groups, and in a further reaction step (B) 50 to 100% of the phenolic hydroxy groups of component (A) are reacted with epoxy compounds, preferably with diepoxy resins with an epoxy equivalent weight of between 50 and 2000.

The invention is also concerned with the use of the paint binders produced according to this invention in water-dilutable paints, particularly cathodically depositable electrodeposition paints.

The aminoalkylation products of phenols suitable for the present invention are produced according to the methods known from literature, for example, Houben-Weyl, *Methoden der organischen Chemie*, Vol. XI/1 (1957). The condensation of ureas with phenol and formaldehyde is described, for example, in Houben-Weyl, Vol. XIV/2 (1963). The phenols suitable for both alternatives A-1 and A-2 are phenol or substituted phenols, such as the monoalkyl phenols, preferably those with at least 4 C-atoms in the alkyl radical. Representatives of this group are the o- and p-butylphenols and their higher homologues. Also, aryl phenols, such as phenylphenol or aralkylphenols, such as bisphenol A which is 2,2-bis(4-hydroxy-phenyl)propane can be used. Suitable primary amines for use in the reaction are mono-primary amines, such as butylamine or its isomers and homologues, primary alkanolamines such as monoethanolamine or its homologues, primary-tertiary diamines such as dialkylaminoalkylamines, exemplified by dimethylaminoethylamine or diethylaminopropylamine, or diprimary amines, such as ethylenediamine and its homologues. In addition to the alkylene diamines, diamines can also be used wherein the carbon chain is interrupted by ether or amino groups. Examples of suitable substances of this type are 4,7-dioxadecane-1,10-diamine; 7-methyl-4,10-dioxatridecane-1,13-diamine or polyoxyalkylene diamines of the formula

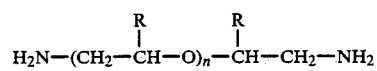

wherein R is H or CH$_3$ and n=1–30. The higher functional amines such as the diethylene- or dipropylenetridmines, polyoxypropylenetriamine and N,N'-bis(3-amino-propyl)-ethylenediamine can also be used. When using amines of higher functionality, it is evident that the further components and reaction conditions have to be judiciously selected in order to prevent gelation. Particularly when using higher functional amines, the quantity of the semi-blocked diisocyanates must be adjusted to the number of NH-functional groups.

It is surprising that even with the use of a difunctional amine, substantially uniform reaction products are obtained on urea formation and aminoalkylation, respectively, with which the further reactions can be carried out in a conventional reaction.

The preferred form of formaldehyde for use according to this invention is the commercially available paraformaldehyde with a formaldehyde content of 80% and more.

In the preferred embodiment of method A-1 above, the aminoalkylation is carried out in order that the components, in the presence of an azeotropic solvent, such as toluol or a correspondinq aliphatic hydrocarbon solvent, are heated to the temperature necessary for the azeotropic removal of the reaction water, taking into In the last step, the reaction products prepared according to methods A-1 and A-2 are reacted with epoxy compounds with the formation of phenol ethers. The preferred epoxy compounds are diepoxy resins based on bisphenol A or polypropylene glycol. Monoepoxy compounds such as the glycidyl esters of monocarboxylic acids, particularly those of the so-called KOCH-acids, as well as 2-ethylhexylglycidyl ether may be coemployed. The reaction is carried out at 80° to 130° C. to an epoxy value of practically zero.

It has been established that the final products show practically no difference, regardless of whether the intermediate product employed with the epoxy resin was prepared according to method A-1 or method A-2. Therefore, it can be assumed that in both cases products result with the same basic composition according to the proposed formula

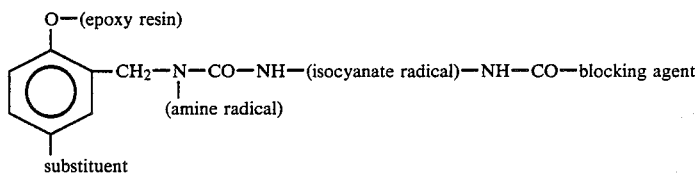

account an eventual exothermic reaction. After removal of the calculated quantity of water, the solvent preferably is vacuum-stripped, and the reaction product is dissolved with or in an aprotic solvent. Optionally, the further reactions can be carried out in the presence of the entraining agent. The reaction product thus obtained, containing in the molecule an average of at least one secondary amino group, is reacted in a next step at 30° to 50° C. with semi-blocked diisocyanates, using 1 mole of isocyanate compound for each NH-group. Through the reaction of the NH-groups with the semi-blocked diisocyanates, the desired urea groups are formed. Hydroxy groups which may be present depending on the starting reactants will react to a negligible extent only, owing to the preferred reaction of the NH-groups with the NCO-groups.

The semi-blocked diisocyanates for use herein are prepared in known manner. The preferably used diisocyanates are those with different reactivity of the NCO-groups, such as toluylenediisocyanate or isophoronediisocyanate. The preferred blocking agents are aliphatic monoalcohols which—optionally in the presence of catalysts—are split-off under the stoving conditions of the materials. Other blocking agents which may be used include phenols, oximes, amines, unsaturated alcohols, caprolactams, and the like.

In alternative method A-2, in the first step a substituted urea is formed from the semi-blocked diisocyanate and the primary amine. In this reaction, the semi-blocked diisocyanate is added at 30° to 60° C., while cooling, to an isocyanate-inert solvent, such as toluol or a glycoldiether, or to a solution of the amine or to a solution of the mixture of various amines and the reaction is carried to an isocyanate value of about zero. Subsequently, at 70° C., the formaldehyde, preferably as paraformaldehyde, is added and the temperature is held for one hour. After addition of the phenol, with rising temperature, the reaction water is entrained through azeotropic distillation at from about 80° to 140° C., with the aid of an entraining agent, preferably toluol. Optionally, the entraining agent is vacuum-stripped afterwards and the batch is dissolved in a hydrophilic solvent.

In a special embodiment of this invention, diepoxy resins partially esterified with mono- or polycarboxylic compounds are used. A judicious selection of this component will influence the rheological and applicational properties of the coating composition and the paint films formed therefrom. Suitable monocarboxy compounds for use herein are the natural and synthetic fatty acids or semi-esters of dicarboxylic acids with aliphatic monoalcohols or hydroxyalkyl oxazolidines. The preferred polycarboxy compounds for use herein are long chain dicarboxylic acids, such as the dimeric fatty acids or carboxy group containing substantially linear polyesters. A further group of polycarboxy compounds are adducts of maleic anhydride to long chain polyene compounds, such as liquid butadiene polymers, where the anhydride groups are opened through reaction with monoalcohols. The reaction with the carboxy compound of the diepoxy resin can be carried out prior to the reaction with the intermediate whereby the reaction is carried out at 100° to 120° C., optionally in the presence of basic catalysts, until an acid value of below 3 mg KOH/g is attained. The reaction with the carboxy compound can also be carried out simultaneously with the last process step. The intermediate prepared according to method A-1 or method A-2, the carboxy compound, and the diepoxy resin are reacted at 90° to 120° C. to an epoxy value of practically zero. In the case where the reaction blend contains diepoxy resins and monoepoxy compounds, preferably the first alternative of the process, i.e., method A-1, is used. Optionally, the monoepoxy compounds may be present during the reaction between diepoxy compound and carboxy compound. Preferably they are added after the carboxy reaction has been carried out and then reacted.

When formulating the reaction batches care is to be taken to obtain final products having the basicity necessary for safeguarding a sufficient stability of the aqueous solution of the binder. The introduction of tertiary amino groups to provide a basicity based on an amine value of at least 30 mg KOH/g is preferably effected through primary-tertiary diamines during aminoalkylation or through the use of suitable amines for semi-blocking the diisocyanates. To achieve water-dilutability, the basic groups of the binder are partially or totally neutralized with acids, preferably formic acid, acetic acid, or lactic acid. For an extent of dilution adequate for practical use, normally a degree of neutralization of 20 to 60% is sufficient, corresponding to a quantity of about 20 to 60 millimoles of acid for 100 g of resin solids. The binders are diluted with deionized water to the desired degree of concentration. Optionally, prior to neutralization and dilution, or in partially diluted form, the binders are processed to piqmented paints with crosslinkinq catalysts, pigments, extenders, and other additives. The formulation of such paints and their use for electrodeposition are known to one skilled in the art and are described in the literature. When the deposited coatings are used as primers, they are cured at 150° to 170° C. for 10 to 30 minutes. Unless the binders have sufficient crosslinking structures, they are combined with additional crosslinkers such as the blocked isocyanates or amine and phenolic resins.

In a special embodiment, a polyhydroxy compound is admixed with the binders. The polyhydroxy compound can be water-soluble or substantially water-insoluble, and will have a hydroxy equivalent weight at a maximum of 1000 and preferably from about 100 to 400. The hydroxy equivalent weight as used herein is the quantity of resin solids (in grams) which contains one mole hydroxy groups. Through this measure, on the one hand, the hydroxy balance important for crosslinking the products is improved. Further, it is possible by this alternative to influence the deposition behavior and the film properties of the binders. The blends may contain between 5 to 80% by weight (b.w.), preferably 10 to 50% b.w., based on resin solids of this admixed component. The suitable water-soluble polyhydroxy compounds are preferably protonated epoxy resin amine adducts and modification products thereof. Products of this type are known from the literature. The selection is governed essentially by the hydroxy equivalent weight. Especially in the formulation of electrodeposition paint binders, materials are preferred which are higher in molecular weight and water-dilutable on protonation, or materials which are not water-dilutable resins but are compatible with the basic resin. Among the latter are, in addition to monomeric polyols with restricted water-solubility, such as trimethylolethane or trimethylolpropane or pentaerythritol, defunctionalized phenols with the necessary hydroxy equivalent weights, such as the reaction products of bisphenol A with ethylene or propylene oxide, defunctionalizes phenol novolaks, epoxy resin esters, epoxy resin amine adducts, substantially insoluble in water, even after protonation, and hydroxy group containing polyurethanes, polyamides and copolymers, for example the available copolymers of unsaturated alcohols and styrol. The admixture of these components is effected, optionally at moderately elevated temperature particularly when using the water-insoluble components, prior to protonation and dilution of the basic resin.

The products of the invention with suitable adjustment of the solids content and the like, can also be applied by methods other than electrodeposition such as by dipping, roller coating, or spraying. Optionally, the binders can be processed in organic solvents.

DETAILED AND PRESENTLY PREFERRED EMBODIMENTS

The following examples illustrate the invention without limiting its scope. Parts and percentages are by weight unless otherwise stated.

EXAMPLE 1

In a suitable reaction vessel 220 parts (1 mole) nonylphenol, 130 parts (1 mole) diethylaminopropylamine, and 100 parts toluol are heated to 75° C.; then, with slight cooling, 33 parts (1 mole) paraformaldehyde, 91%, are added. The temperature is slowly raised until a continuous azeotropic distillation starts. After separation of 21 parts reaction water, the toluol is vacuum-stripped and the product is dissolved in 167 parts diethyleneglycol dimethylether. The obtained solution is mixed at 30° to 40° C., while cooling, with 304 parts (1.0 mole) toluylene diisocyanate, semi-blocked with 2-ethylhexanol, and held at 40° C. for 90 minutes, wherein an NCO-value of practically zero is attained.

Then 475 parts of an epoxy resin based on bisphenol A and having an epoxy equivalent weight of about 475 are dissolved in 200 parts propyleneglycol monomethylether. 835 parts of the intermediate product as prepared above are added and reacted at 95° to 100° C. to an epoxy value of practically zero. 0.5 parts/100 g resin solids, calculated as metal, of a tin catalyst, for example dibutyltindilaurate, are added. Upon addition of 50 millimoles of formic acid per 100 g of resin solids, the product can be infinitely diluted with water. Films stoved at 160° C. have a resistance to methylethylketone of more than 150 double rubs. This test as used herein comprises rubbing the film with methylethylketone in a forward and a return stroke. The forward and return stroke constitutes one double rub.

The term "an epoxy resin based on bisphenol A" as used herein refers to an epoxy resin formed by the reaction of the sodium salt of bisphenol A with epichlorohydrin, the ratios of materials being selected to provide the designated epoxy equivalent weight according to conventional reaction methods.

EXAMPLE 2

As described in Example 1, 228 parts (1 mole) bisphenol A, 260 parts (2 moles) diethylaminopropylamine, and 66 parts (2 moles) paraformaldehyde, 91%, are reacted in the presence of 131 parts toluol as azeotropic entraining agent, until 42 parts water have formed. After addition of 152 parts diethyleneglycol dimethylether and cooling to 30° C., within a period of 45 minutes 608 parts (2 moles) of toluylene diisocyanate semi-blocked with 2-ethylhexanol are added. When an NCO-value of practically zero is attained, 1400 parts of the obtained solution are mixed with a solution of 190 parts of an epoxy resin based on bisphenol A having an epoxy equivalent weight of about 190 and with 250 parts (1 mole) of a glycidylester of a mixture of tertiary $C_9$-$C_{11}$-monocarboxylic acid in 389 parts diethyleneglycol dimethylether and reacted at 95 to 100° C. to an epoxy value of zero. 0.6 parts/100 g of resin solids of a tin catalyst (calculated as metal), such as dibutyl tindilaurate are added. Upon addition of 40 millimoles formic acid per 100 g resin solids, the product can be infinitely diluted with water. Electrodeposited films, cured at 160° C., have a resistance to methylethylketone of more than 150 double rubs.

EXAMPLE 3

In a suitable reaction vessel 116 parts (1 mole) 1,6-hexamethylenediamine, 440 parts (2 moles) nonylphenol, 66 parts (2 moles) paraformaldehyde, 91%, and 148 parts toluol are heated to 90° C., and 42 parts water are separated by azeotropic distillation. Then the toluol is vacuum-stripped and replaced by 396 parts diethyleneglycol dimethylether. To this solution 608 parts (2 moles) of a toluylene diisocyanate semi-blocked with 2-ethylhexanol are slowly added at 40° C. and reacted to an NCO-value of zero (Intermediate 1).

In a second reaction vessel 220 parts (1 mole) nonylphenol, 260 parts (2 moles) diethylaminopropylamine, and 130 parts toluol are heated to about 60° C. When, while cooling, 66 parts (2 moles) paraformaldehyde, 91%, are added and the temperature is slowly raised until a continuous distillation develops. After separation of 42 parts reaction water, the toluol is vacuum-stripped and the reaction product is dissolved with 278 parts diethyleneglycol dimethylether. The obtained solution is reacted at a maximum of 40° C., while cooling, with 608 parts (2 moles) of a toluylene diisocyanate semi-blocked with 2-ethylhexanol, to an NCO-value of zero (Intermediate 2).

1548 parts of Intermediate 1, 2780 parts of Intermediate 2, and 760 parts (4 equivalents) of a diepoxy resin based on bisehenol A having an epoxy equivalent weight of about 190, and 440 parts methoxypropanol are held at 90° C. until the epoxy groups have reacted completely.

0.6 parts/100 g resin solids (calculated as metal) dibutyltindilaurate and 35 millimoles formic acid per 100 g resin solids are added to render the product water-dilutable.

Electrodeposition films cured at 160° C. show a resistance to methylethylketone of more than 150 double rubs.

EXAMPLE 4

80 parts resin solids of the reaction product of Example 1 are thoroughly mixed with 20 parts (resin solids) of PHC 1 (described below), and 0.8 parts (calculated as metal) dibutyltindilaurate and 50 millimoles formic acid are added. A 10% clear varnish is prepared through dilution with deionized water. The electrodeposition and cured films, curing being at 160° C., have a resistance to methylethylketone of more than 150 double rubs.

PHC 1 is a polyhdroxy compound water-soluble upon protonation having a hydroxy equivalent weight of about 300, and produced as follows: 500 parts of an epoxy resin based on bisphenol A having an epoxy equivalent weight of about 500 are dissolved in 214 parts propyleneglycol monomethylether and reacted at 110° C. with 83 parts of a semiester of phthalic anhydride and 2-ethylhexanol, to an acid value of below 3 mg KOH/g in the presence of 0.5 g triethylamine. Then, 120 parts of an NHfunctional oxazolidine of aminoethylethanolamine, 2-ethylhexyl acrylate and formaldehyde, and 26 parts diethylaminopropylamine are added and the batch is reacted at 80° C. to an epoxy value of practically zero. The batch is diluted with 200 parts propyleneglycol monomethylether.

EXAMPLE 5

75 parts resin solids of the solution prepared according to Example 2 are thoroughly mixed with 25 parts (resin solids) of PHC 2 (described below), and 0.8 parts (calculated as metal) dibutyltindilaurate and 35 millimoles formic acid. Films are deposited of the 10% aqueous varnish on degreased steel panels and cured at 150° C. The films have a resistance to methylethylketone of more than 150 double rubs.

PHC 2 is a polyhdroxy compound water-soluble upon protonation having a hydroxy equivalent weight of about 145. It is the reaction product produced in known manner from 1 mole of an epoxy resin based on bisphenol A having an epoxy equivalent weight of about 475 and 2 moles diethanolamine used as a 70% solution in methoxypropanol.

To further illustrate the invention, intermediate A-1 and A-2 are prepared as illustrated in Tables 1 and 2, respectively. The intermediate materials made according to method A-1, which are designated in Table 1 as VP 1, 2, 3 and 4, were prepared generally in accordance with the procedure of Examples 1 and 2 using the materials and weight ratios listed in Table 1. These intermediate materials, as shown in Examples 6–10 of Table 3, were reacted with an epoxy compound which was partially reacted with a mono-and/or polycarboxylic compound, i.e., the component designated CV.

Intermediate materials designated in Table 2 as VP 5, 6, 7, 8, and 9 are prepared according to method A-2 using the type and quantity of the starting materials as listed in Table 2. In this preparation the amine (blend) is dissolved in a suitable reaction vessel in the designated solvent and the semi-blocked diisocyanate is added in portions while cooling. The temperature may rise from 30° to 60° C. The reaction is carried at 60° C. to an NCO-value of practically zero. Subsequently, at 70° C., the provided quantity of formaldehyde is added as paraformaldehyde ($CH_2O$-content 90 to 100%) and the temperature is held for one hour. After addition of the phenol, an azeotropic distillation is set up, for example with toluol, and the reaction water is separated at 80° to 140° C. After about one mole of water has separated per mole of $CH_2O$, the entraining agent is optionally vacuum-stripped and replaced by the foreseen solvent. The intermediate products, VP 5–9 of Table 2, are reacted with an epoxy component as designated in Examples 11–15, the starting materials and specifications being as listed in Table 3.

The starting materials for Example 6–15 as listed in Table 3 can be reacted in a one-step process or in a two-step process. There is no difference in the properties of the products beyond statistical fluctuations obtained in the one-step or two-step process. In the one-step process the components are reacted at 95° to 100° C. in a 70% solution in a solvent, preferably in DGDM, until the epoxy groups have reacted completely. Monoglycidyl compounds when used preferably are reacted after the reaction of the diepoxy resins with the carboxy compounds. In the two-step process, the diepoxy resin is reacted in first step at 100° to 120° C. in the presence of 0.05 to 0.2% b.w. triethylamine with the carboxy compound to an acid value of below 0.3 mg KOH/g. After addition of the modified aminoalkylation product (VP) and the monoglycidyl compound when used and adjustment to a solids content of 70 to 75% with DGDM, the reaction is carried on at 90° to 100° C. to an epoxy value of practically zero.

For further processing the products are adjusted to a solid content as listed in Table 3. The solvents mainly are glycolethers, preferably methoxypropanol. The column entitled "Solubility" in Table 3 gives the quantity of formic acid (in millimoles) per 100 g resin solids necessary for a stable clear varnish of 15% solids content, diluted with water.

TABLE 1

Method A-1

| VP | Phenol Parts | (Mole) | Formaldehyde Parts | (Mole) | Amine Parts | (Mole) | MIC Parts | (Mole) | Solvent (solids) | Mol. Wt. per Phenol/OH |
|---|---|---|---|---|---|---|---|---|---|---|
| 1 | 220 NPH | (1.0) | 30 | (1.0) | 102 DMAPA | (1.0) | 264 MIC I | (1.0) | DGDM 80% | 598/1 |
| 2 | 228 BA | (1.0) | 30 | (1.0) | 130 DEAPA | (1.0) | 304 MIC II | (1.0) | DGDM 70% | 674/2 |
| 3 | 228 BA | (1.0) | 60 | (2.0) | 260 DEAPA | (2.0) | 528 MIC I | (2.0) | DGDM 70% | 1040/2 |
| 4 | 94 PH | (1.0) | 60 | (2.0) | 102 DMAPA | (1.0) | 608 MIC II | (1.0) | DGDM 70% | 957/1 |
|   |        |       |    |       | 129 EHA   | (1.0) |            |       |          |       |

TABLE 2

Method A-2

| VP | Amine Parts | (Mole) | MIC Parts | (Mole) | Formaldehyde Parts | (Mole) | Phenol Parts | (Mole) | Solvent (solids) | Mol. Wt. per Phenol/OH |
|---|---|---|---|---|---|---|---|---|---|---|
| 5 | 130 DEAPA | (1.0) | 304 MIC II | (1.0) | 30 | (1.0) | 94 PH | (1.0) | DGDM 70% | 540/1 |
| 6 | 520 DEAPA | (4.0) | 1824 MIC II | (6.0) | 180 | (6.0) | 880 NPH | (4.0) | DGDM 65% | 3412/4 |
|   | 116 HMDA  | (1.0) |             |       |     |       |         |       |          |        |
| 7 | 260 DEAPA | (1.0) | 528 MIC I  | (2.0) | 60  | (2.0) | 228 BA  | (1.0) | DGDM 70% | 1040/2 |
| 8 | 119 AEPD  | (1.0) | 608 MIC II | (2.0) | 60  | (2.0) | 228 BA  | (1.0) | DGDM 70% | 1081/2 |
|   | 102 DMAPA | (1.0) |            |       |     |       |         |       |          |        |
| 9 | 258 EHA   | (2.0) | 678 MIC III| (2.0) | 60  | (2.0) | 228 BA  | (1.0) | Tuluol 75% | 1188/2 |

TABLE 3

| Ex. | EPH Parts | (Val) | VP Parts | (Mole) | CV Parts | (Val) | Solvent (solids) | Solubility (mMole) |
|---|---|---|---|---|---|---|---|---|
| 6 | 1824 EPH II | (3.8) | 1076 VP 1 | (1.8) | 410 CV 4 | (0.5) | MOP 65% | 40 |
|   |             |       | 506 VP 2  | (0.75)|          |       |         |    |
| 7 | 760 EPH II  | (4.0) | 674 VP 2  | (1.0) | 336 CV 1 | (2.0) | EGL 70% | 35 |
| 8 | 960 EPH II  | (2.0) | 957 VP 4  | (1.0) | 278 CV 2 | (1.0) | DGDM 65%| 40 |
| 9 | 380 EPH I   | (2.0) | 1040 VP 3 | (1.0) | 475 CV 3 | (1.0) | MOP 65% | 35 |
|   | 150 EPH IV  | (1.0) |           |       |          |       |         |    |
| 10| 400 EPH I   | (2.1) | 1040 VP 3 | (1.0) | 428 CV 3 | (0.9) | MOP 65% | 35 |
|   | 275 EPH III | (1.1) |           |       | 280 CV 5 | (0.3) |         |    |
| 11| 480 EPH II  | (1.0) | 540 VP 5  | (1.0) | —        |       | MOP 65% | 50 |
| 12| 760 EPH I   | (4.0) | 3412 VP 6 | (1.0) | —        |       | DGDM 60%| 35 |
| 13| 190 EPH I   | (1.0) | 1040 VP 7 | (1.0) | —        |       | MOP 60% | 40 |
|   | 250 EPH III | (1.0) |           |       |          |       |         |    |
| 14| 190 EPH I   | (1.0) | 1081 VP 8 | (1.0) | —        |       | MOP 65% | 55 |
|   | 150 EPH IV  | (1.0) |           |       |          |       |         |    |
| 15| 480 EPH II  | (1.0) | 1188 VP 9 | (1.0) | —        |       | MOP 70% | 60 |
|   | 250 EPH III | (1.0) |           |       |          |       |         |    |

Val = Equivalent weight in grams for the designated functional group and, accordingly, is equivalent to groups.

The following abbreviations are used in the tables:

| PH | phenol |
|---|---|
| NPH | nonylphenol |
| BA | bisphenol A |
| DMAPA | N,N—dimethylaminopropylamine |
| DEAPA | N,N—diethylaminopropylamine |
| AEPD | aminoethylpropanediol |
| EHA | 2-ethylhexylamine |
| HMDA | 1,6-hexamethylene diamine |
| MIC I | toluylene diisocyanate semi-blocked with EGL |
| MIC II | toluylene diisocyanate semi-blocked with 2-ethyl hexanol |
| MIC III | isophorone diisocyanate, semi-blocked with diethylethanolamine |
| EPH I | diepoxy resin based on bisphenol A (epoxy equivalent weight about 190) |
| EPH II | diepoxy resin based on bisphenol A (epoxy equivalent weight about 480) |
| EPH III | glycidylether of tertiary $C_9$-$C_{11}$-monocarboxylic acids (epoxy equivalent weight 250) |
| EPH IV | phenylglycidylether (epoxy equivalent weight 150) |
| CV 1 | isononanoic acid |
| CV 2 | semi-ester of phthalic anhydride and 2-ethylhexanol (molecular weight 278) |
| CV 3 | semi-ester of tetrahydrophthalic anhydride and a hydroxyoxazolidine (of 1 mole monoethanolamine, 1 mole EPH III and 1 mole formaldehyde), molecular weight 475 |
| CV 4 | linear polyester of 1 mole adipic acid, 2 moles trimethylolpropane, and 0.6 mole tetrahydrophthalic anhydride (acid value about 70 mg KOH/g) |
| CV 5 | adduct compound of a polybutadiene oil (average molecular weight about 1400) and maleic anhydride (weight ratio 7:1), the anhydride groups of which are opened with 2-ethylhexanol (acid equivalent about 930) |
| DGDM | diethylene glycol dimethyl ether |
| EGL | monoethyleneglycol monoethylether |
| MOP | methoxypropanol |

The binders prepared according to Examples 6–15 were electrodeposited on steel panels as clear varnish. For preparing the clear varnish, the resin solution resulting from the examples was mixed with 0.6% metal on resin solids of the corresponding quantity of dibutyltindilaurate and diluted to 15% solids with deionized water. The films were cured for 20 minutes at 160° C. and had, with a film thickness of 20±2 μm, a resistance to methylethylketone of at least 150 double rubs.

Preparation And Evaluation Of Pigmented Paints Based On The Binders Of The Invention According to Table 4, pigmented paints were prepared and electrodeposited as is conventional on degreased zinc-phosphated steel panels, the panels being wired as the cathode in an electrodeposition system. The conditions were chosen so that after curing for 15 minutes at 170° C. a film of 20 μm resulted. Table 4 is as follows:

TABLE 4

Formulation Of Electrodeposition Paints

| Paint | Ex. | Binder Pigment Paste* | Pigment/ Binder Ratio (Paint) | Catalyst (1) | Neutral- ization (2) | Paint Solids (3) |
| --- | --- | --- | --- | --- | --- | --- |
| A | 1 | I | 0.4:1 | 0.6 | 50 | 20 |
| B | 2 | I | 0.3:1 | 0.7 | 40 | 16 |
| C | 3 | II | 0.5:1 | 0.8 | 35 | 18 |
| D | 4 | I | 0.4:1 | 0.8 | 50 | 16 |
| E | 5 | I | 0.4:1 | 0.5 | 35 | 16 |
| F | 6 | I | 0.3:1 | 0.8 | 40 | 18 |
| G | 7 | II | 0.4:1 | 0.6 | 35 | 17 |
| H | 8 | I | 0.45:1 | 0.6 | 40 | 15 |
| I | 9 | II | 0.35:1 | 0.8 | 40 | 20 |
| K | 10 | I | 0.5:1 | 0.7 | 40 | 18 |
| L | 11 | I | 0.4:1 | 0.6 | 50 | 20 |
| M | 12 | II | 0.5:1 | 0.8 | 35 | 18 |
| N | 13 | I | 0.3:1 | 0.7 | 45 | 16 |
| O | 14 | I | 0.4:1 | 0.8 | 55 | 18 |
| P | 15 | I | 0.4:1 | 0.8 | 60 | 16 |

(1) % Tin (as dibutyltindilaurate)
(2) millimoles formic acid per 100 g resin solids
(3) % total solids
*Pigment paste I is a resin produced as follows:
In a reaction vessel equipped with stirrer, thermometer, addition funnel, water separator and reflux condensor, 440 parts of an epoxidized polybutadiene having a molecular weight of about 1400, and an epoxy equivalent of about 440 are reacted in the presence of 0.5 parts 2,6-di-tert.-butyl-4-methylphenol (inhibitor) with 92 parts dimethylamino propylamine, at 160–200° C., until all the epoxy groups are consumed. After cooling to 80° C., 30 parts (0.9 mole) paraformaldehyde, 91%, are added and, with a benzine solvent having a boiling range of 80–120° C., 18 parts reaction water are removed azeotropically at 80° C. After vacuum-stripping the entraining agent, the batch is dissolved in 59 parts ethyleneglycol monobutylether. The resin has the following characteristics:

| | |
| --- | --- |
| viscosity | 2600 mPa.s/25° C. |
| oxazolidine equivalent (calc.). | 604 |
| amine value | 185 mg KOH/g |
| aliphatic content | 80% |
| molecular weight (calc.) | 1632 |
| solubility (1) | 25 millimoles formic acid per 100 g resin solids |

(1) Quantity of acid necessary to form a stable aqueous solution.

A 15% solution is prepared from 100 parts based on resin solids of the grinding vehicle, 20 parts of a 25% solution in EGL of a wetting agent based on an acetylene alcohol, 24 parts lactic acid (5-N) and deionized water, and is passed over a laboratory pearl mill together with 24 parts carbon black, 1104 parts titanium dioxide, and 72 parts basic lead silicate (pigment/binder ratio 12:1).

Pigment paste II is based on the PHC 1 described in Example 4. 100 parts based on resin solids of PHC 1 are milled as described above with 1 part carbon black, 147 parts titanium dioxide, and 12 parts basic lead silicate (pigment/binder ratio 1.6:1).

The corrosion resistance of the films prepared in Table 4 was tested in the salt spray test according to ASTM B 117-73. Other tests of the films included a cross incision test (DIN 53 151) and a mandrel test (DIN 53 152). The results are listed in Table 5.

TABLE 5

Test Results (Stoving Conditions 15 Min/170° C.)

| Paint | Salt Spray Test/hours | Cross Incision | Mandrel Test (mm) |
| --- | --- | --- | --- |
| A | 1500 | 0 | 12 |
| B | 1800 | 1 | 8 |
| C | 1800 | 1 | 5 |
| D | 2000 | 0 | 8 |
| E | 2000 | 0 | 2 |
| F | 1000 | 1 | 2 |
| G | 1000 | 0 | 5 |
| H | 1200 | 2 | 20 |
| I | 1000 | 1 | 10 |
| K | 2000 | 0 | 2 |
| L | 1500 | 0 | 12 |
| M | 1800 | 1 | 5 |
| N | 1800 | 1 | 8 |
| O | 1400 | 0 | 2 |
| P | 1000 | 2 | 8 |

It is surprising that even with reduced stoving temperatures to 160° and 150° C., with a stoving time of 15 to preferably 20 minutes, the results are not substantially inferior.

As will be apparent to one skilled in the art, various modifications can be made within the scope of the aforesaid description. Such modifications being within the ability of one skilled in the art form a part of the present invention and are embraced by the appended claims.

It is claimed:
1. Self-crosslinking cationic paint binders, water-dilutable on protonation, comprising the reaction product of component (A) and component (B) wherein component (A) is
(A-1) an aminoalkylation product carrying an average of at least one NH-group per molecule, of a phenol compound, an amino compound selected from the group consisting of a primary alkylamine, a primary alkanolamine, an alkylenediamine and mixtures thereof and formaldehyde subsequently reacted with a semi-blocked diisocyanate or
(A-2) a semi-blocked diisocyanate reacted with an amino compound selected from the group consisting of a primary alkylamine, a primary alkanolamine, and an alkylenediamine, and the resulting substituted urea thereafter reacted with formaldehyde and a phenol compound,
and component (B) is
an epoxy compound having an epoxy equivalent weight of from about 50 to 2000 and wherein from about 50 to 100% of the phenolic hydroxy groups of component (A) are reacted with component (B) to provide a product having an amine value of at least 30 mg KOH/g.
2. The binder according to claim 1 wherein in component (A) the phenol compound is a monoalkylphenol.
3. The binder according to claim 1 wherein in component (A) the phenol compound is a monoarylphenol.
4. The binder according to claim 1 wherein in component (A) the phenol compound is aralkylphenol.
5. The binder according to claim 4 wherein the aralkylphenol contains two phenolic hydroxy groups.
6. The binder according to claim 1 wherein in component (A) the semi-blocked diisocyanate is toluylene diisocyanate blocked with an aliphatic monoalcohol.

7. The binder according to claim 6 wherein the aliphatic monoalcohols will split-off at a temperature of from about 150° to 170° C.

8. The binder according to claim 1 wherein the epoxy compound is a diepoxide.

9. The binder according to claim 1 wherein the amines of component (A) are diprimary alkylamines used in combination with primary-tertiary alkylamines.

10. The binder according to claim 8 wherein 5 to 50% of the glycidyl groups of the diepoxy resins used in step (B) are reacted with mono- or polycarboxy compounds prior to the reaction with component (A).

11. The binder according to claim 8 wherein 5 to 50% of the glycidyl groups of the diepoxy resins used in step (B) are reacted with mono- or polycarboxy compounds simultaneous with the reaction of step (B).

12. The binder according to claim 10 wherein from 10 to 40% of the glycidyl groups of the diepoxy resins used in step (B) are reacted with mono- or polycarboxy compounds.

13. The binder according to claim 10 wherein natural or synthetic fatty acids or semi-esters of dicarboxylic acids with aliphatic monoalcohols or hydroxyalkyloxazolidines are used as the monocarboxy compound.

14. The binder according to claim 1 wherein the amine value of at least 30 mg KOH/g stems from tertiary amino groups which are introduced by a diamine carrying tertiary amino groups used for the production of component (A) or an amine used for the semi-blocking of the diisocyanates of component (A).

* * * * *